(12) United States Patent
Johnson et al.

(10) Patent No.: US 8,789,942 B2
(45) Date of Patent: Jul. 29, 2014

(54) BRAIDED EYEWEAR RETAINER

(75) Inventors: Thomas Johnson, Houston, TX (US); Michelle L. Hyers, Greenlawn, NY (US); Matthew R. Schoen, East Williston, NY (US)

(73) Assignee: Carson Optical, Inc., Hauppauge, NY (US)

( * ) Notice: Subject to any disclaimer, the term of this patent is extended or adjusted under 35 U.S.C. 154(b) by 286 days.

(21) Appl. No.: 13/336,323

(22) Filed: Dec. 23, 2011

(65) Prior Publication Data

US 2013/0162941 A1    Jun. 27, 2013

(51) Int. Cl.
*G02C 3/00* (2006.01)

(52) U.S. Cl.
USPC .......................................... 351/156; 351/157

(58) Field of Classification Search
CPC ................................ G02C 3/003; G02C 3/006
USPC .................................................. 351/156, 157
See application file for complete search history.

(56) References Cited

U.S. PATENT DOCUMENTS

| | | |
|---|---|---|
| 2,114,274 A | 4/1938 | Huppert |
| 4,089,064 A | 5/1978 | Chandler, Jr. |
| 4,252,871 A | 2/1981 | Sundberg |
| 4,541,696 A * | 9/1985 | Winger et al. ................ 351/123 |
| 4,696,556 A | 9/1987 | Perry, III |
| 4,741,087 A | 5/1988 | Plummer, Jr. |
| 4,922,581 A | 5/1990 | Wilson |
| D322,446 S | 12/1991 | Bell, Jr. |
| D328,908 S | 8/1992 | Kalbach |
| 5,191,903 A | 3/1993 | Donohue |
| 5,369,452 A | 11/1994 | Williams |
| D370,023 S | 5/1996 | Torrey |
| 5,649,541 A | 7/1997 | Stuckey |
| 5,655,263 A | 8/1997 | Stoller |
| 6,644,808 B1 | 11/2003 | Liu |
| 6,764,177 B1 | 7/2004 | Chisolm |
| 6,941,619 B2 | 9/2005 | Mackay et al. |
| 7,828,429 B2 | 11/2010 | Spinnato et al. |

* cited by examiner

*Primary Examiner* — Hung Dang
(74) *Attorney, Agent, or Firm* — Carmody Torrance Sandak & Hennessey LLP

(57) ABSTRACT

An eyewear retainer for glasses, in which braided tubular sleeves with bonded terminal ends hold onto the temple piece of the glasses. The eyewear retainer consists of two braided tubular sleeves, with at least one of the terminal ends of each sleeve ending in a plurality of terminal ends of the braided strings or ribbons. The two braided tubular sleeves may be connected via a continuous braid or used with another intermediary component. The length of the device is selected for comfortable use and may be adjusted during use. In a preferred embodiment, the bonding of the terminal ends is accomplished, via a silicone-based epoxy to provide a flexible and tacky bond, which allows a more secure hold.

26 Claims, 11 Drawing Sheets

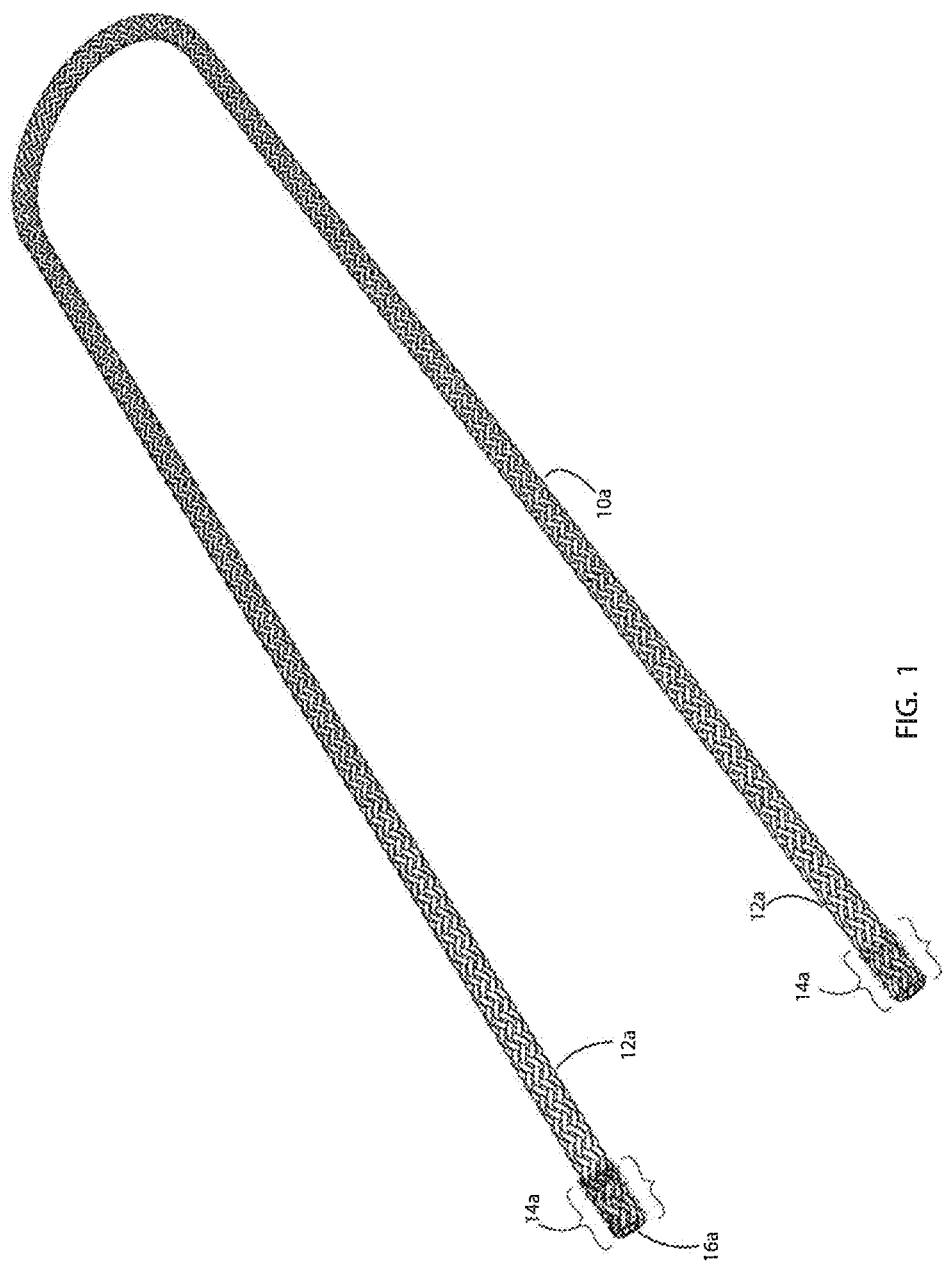

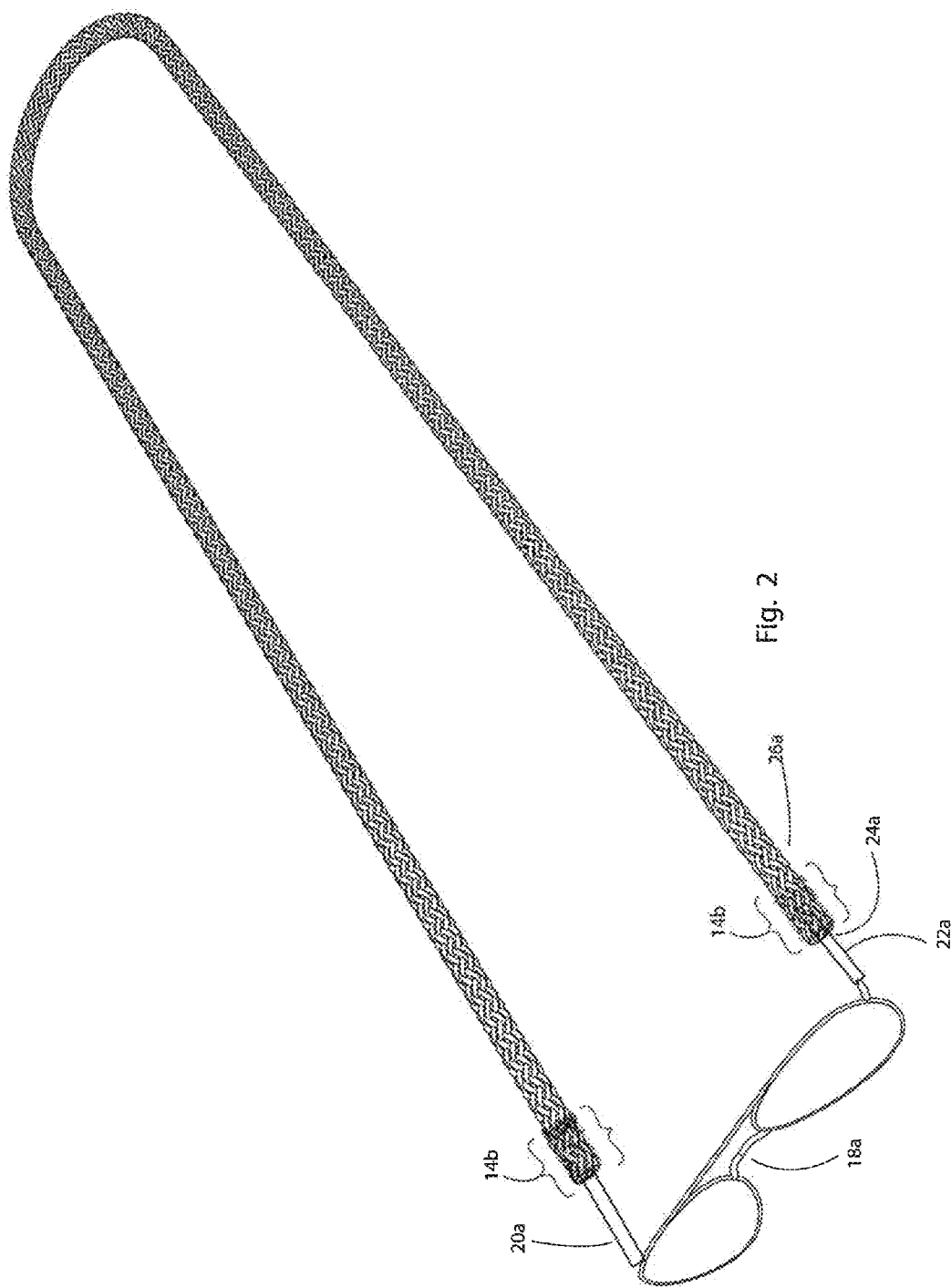

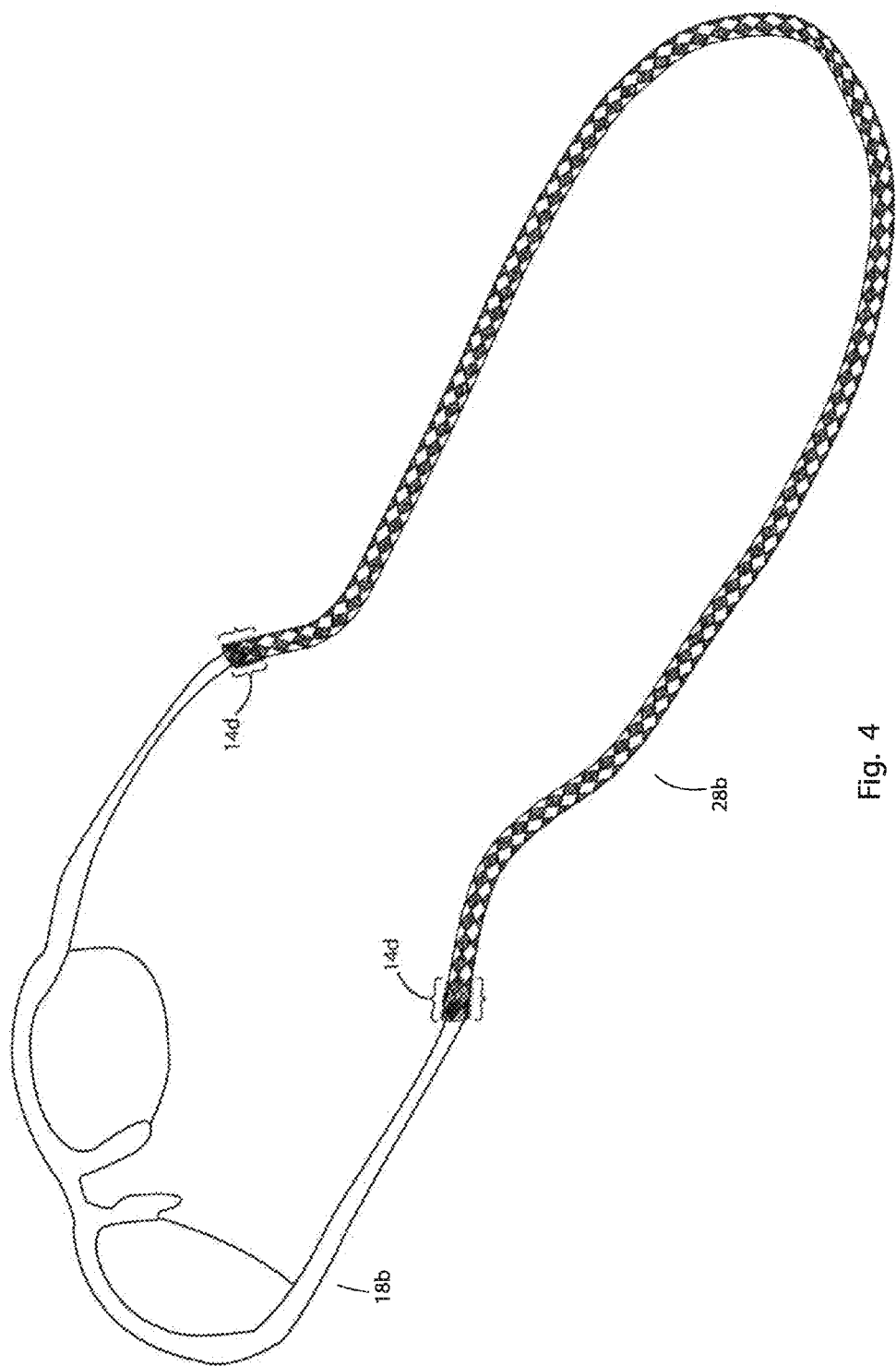

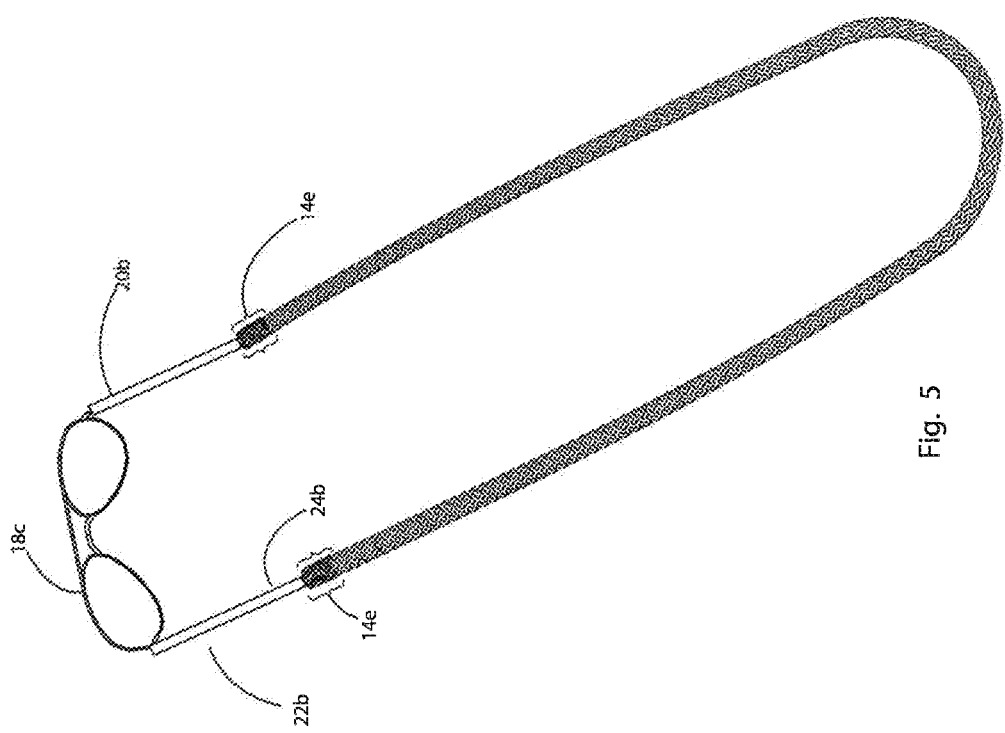

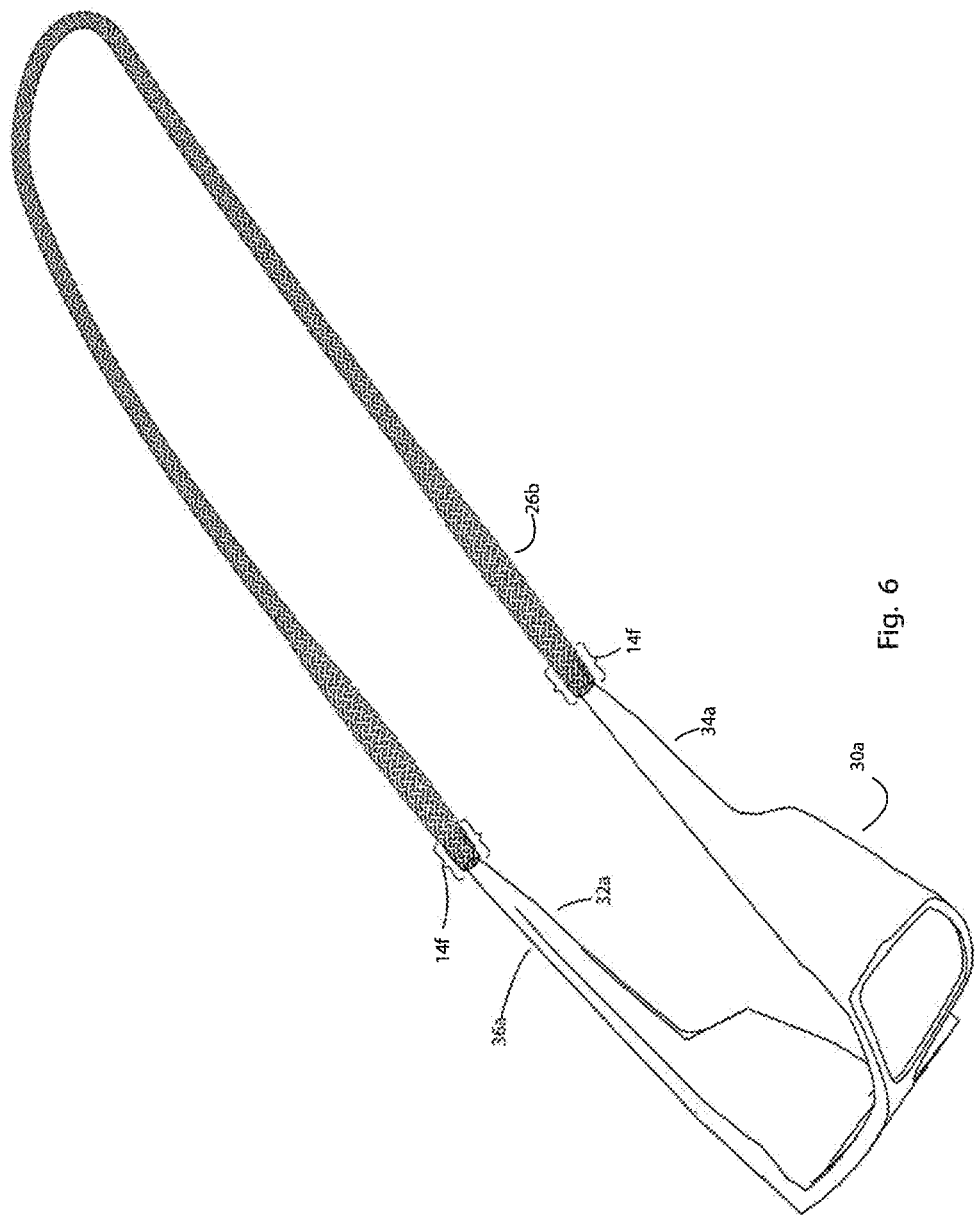

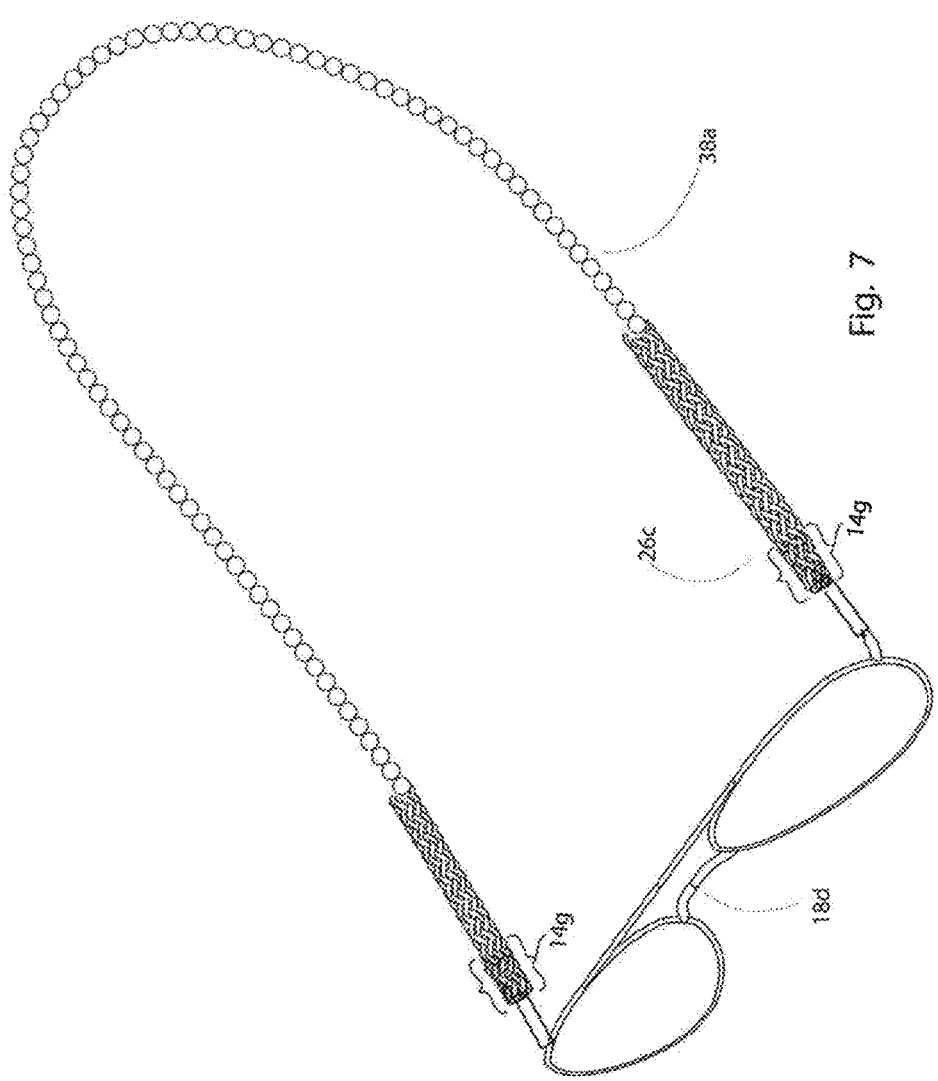

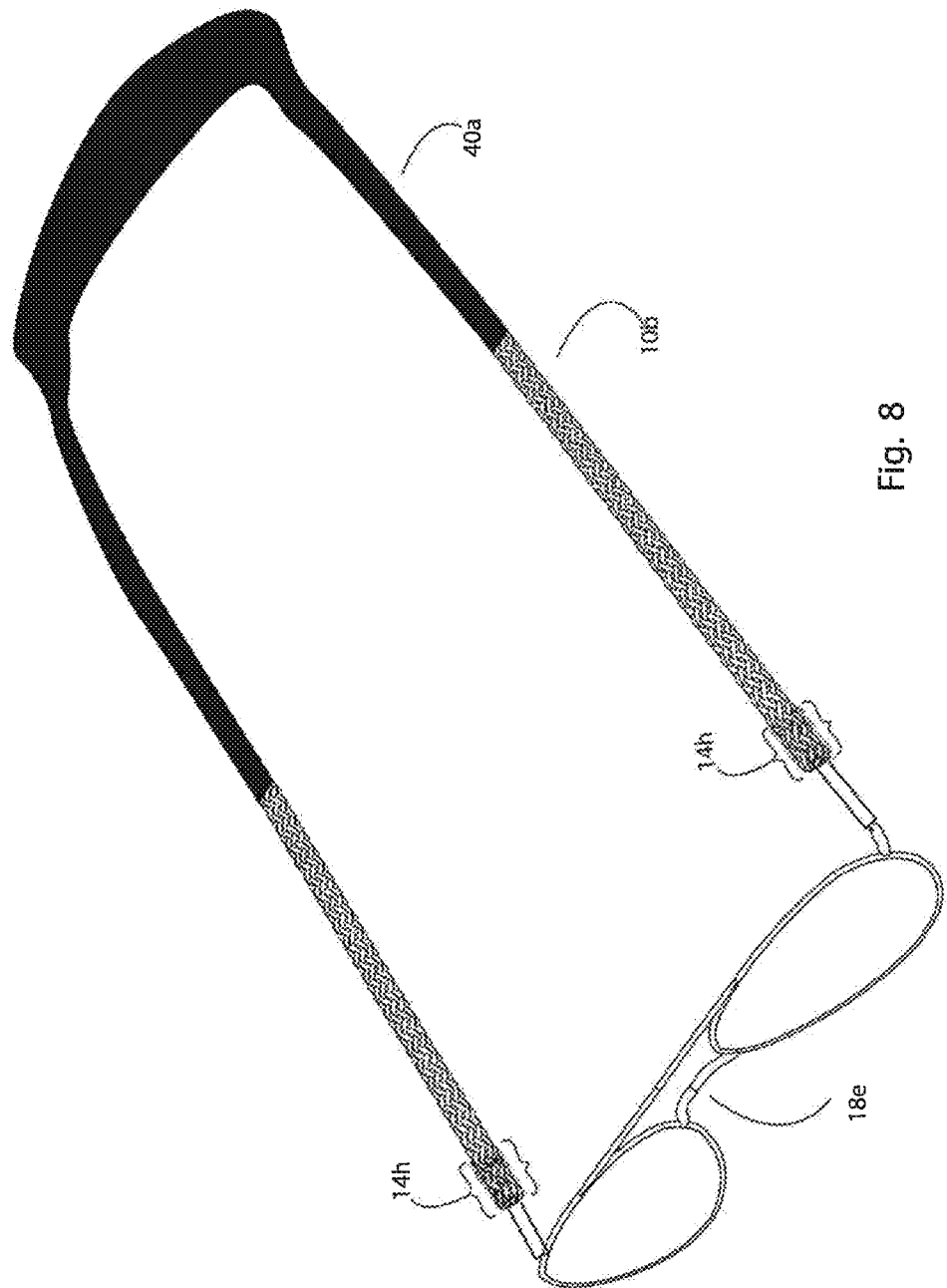

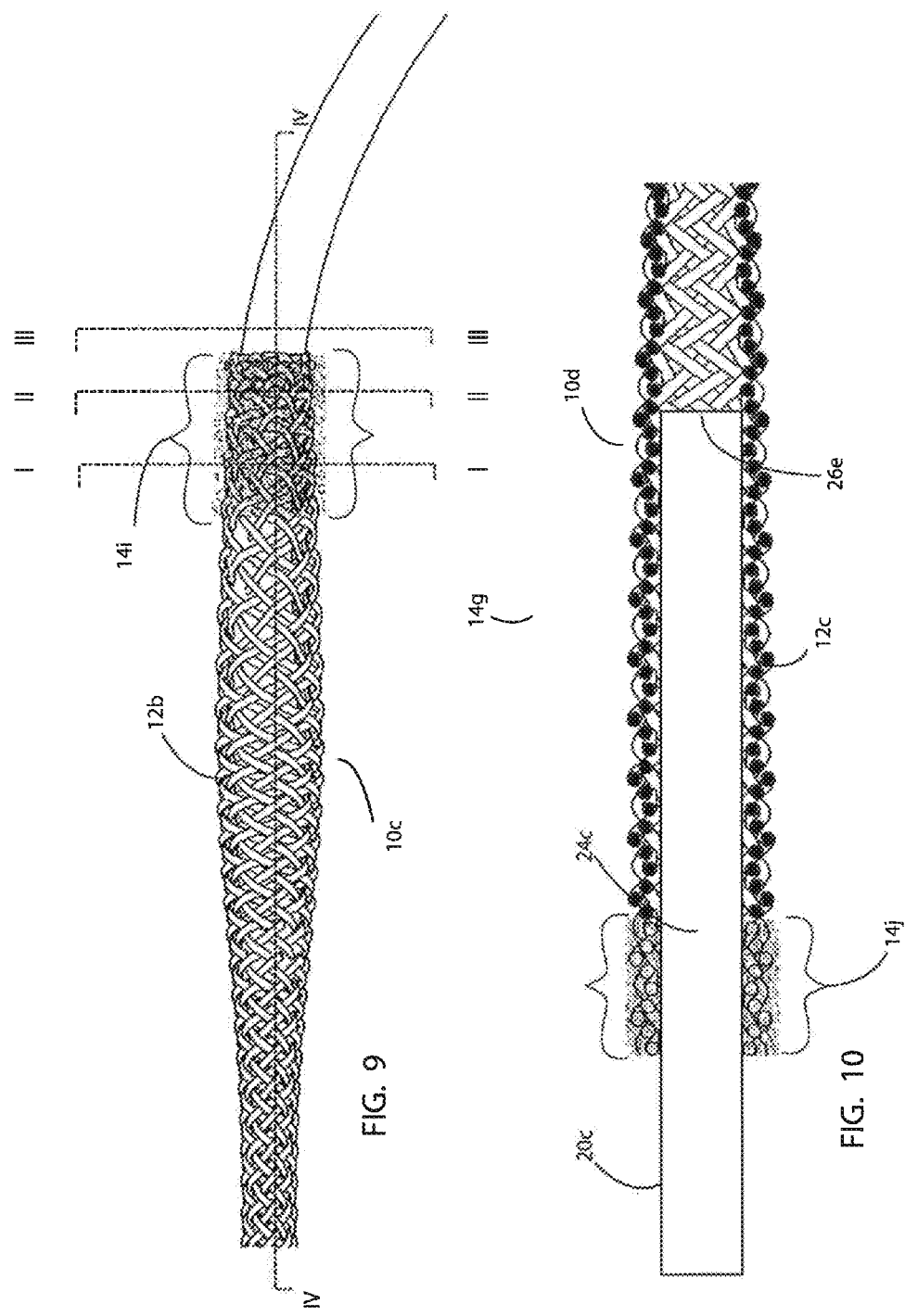

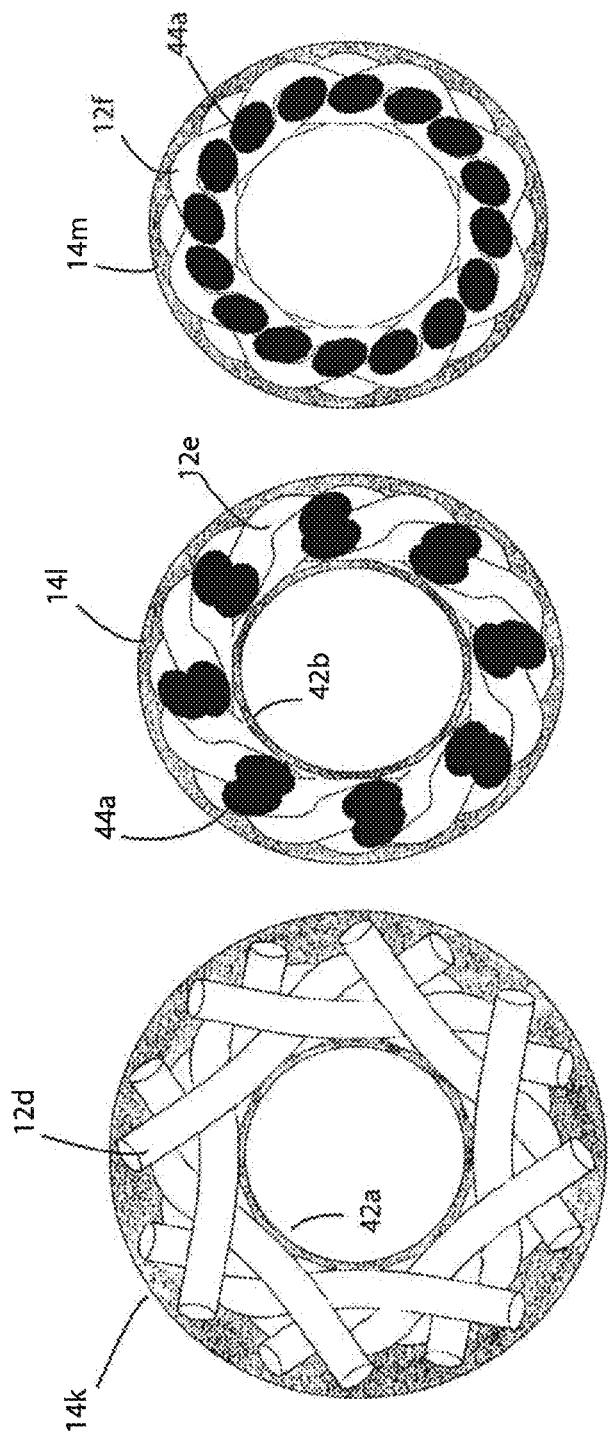

BRAIDED EYEWEAR RETAINER

FIELD OF THE INVENTION

The present invention relates generally to eyewear retainers and more particularly relates to a novel and improved eyewear retainer, which can securely fit a wide range of sizes and shapes of eyeglasses and can retain the eyeglasses in place on a wearer's face or allow the wearer to suspend the eyeglasses from his or her neck.

Eyewear is worn by many people for a multitude of reasons. Many people wear eyeglasses or bifocals to correct vision impairments. Still others wear sunglasses to protect their eyes from the damaging rays of the sun. Many people who wear eyeglasses and other eyewear do not need to wear them all the time. When not in use glasses may be dropped, lost, or damaged, or must be stored in a bulky protective case if they are not worn on the users face. When doing physical activity there is also a risk that eyewear can fall off of a user's face and be damaged. To prevent damage, eyewear retainers can be worn to keep the eyewear firmly in place on a users face or suspend them from the user's neck.

BACKGROUND OF THE INVENTION

Various eyewear retainers are known in the prior art and in use today. Many of these devices are made from textile fabric tubing, generally of a small diameter made from knitted elastic fibers. This type of retainer is constructed by cutting the tubing to an appropriate length and inserting each temple of the eyeglasses into one of the open ends of the tube. The diameter of the tube is usually made small enough to snuggly fit over the temples of the eyeglass, while securing them in place. There are several problems with this form of eyewear retainer. The first issue is that the knitted tube material does not grip the eyeglasses with adequate force to keep the eyeglasses from slipping out of the open ends. The second problem is that the stiff fibers that the tube is knitted from do not allow the open ends to open wide enough to fit different sizes of eyeglass temples. Most eyewear retainers of this form are sized to fit only a small range of sizes of eyeglass frames.

Thus, an eyewear retainer that can securely attach to eyeglass frames of a wide range of sizes and shapes while still being simple, attractive, and lightweight would provide distinct and desirable advantages over the prior art. It is thus believed that the present invention overcomes the aforementioned deficiencies and achieves the aforementioned and below mentioned objectives.

SUMMARY OF THE INVENTION

To overcome the perceived deficiencies in the prior art and to achieve the objects and advantages set forth above and below, the present invention is, generally speaking, directed to a novel and improved eyewear retainer, which can securely fit a wide range of sizes and shapes of eyeglasses. Also provided herein are methods of using the retainer of the present invention.

For example, an objective of the present invention is to provide an improved eyewear retainer that adequately fits a wide range of sizes and shapes of eyeglasses. Said eyewear retainer is simple, attractive, easier to use and generally more desirable and versatile than prior art constructions.

Another objective of the present invention is the additional features of easy attachment and detachment to and from eyeglasses. Yet another object of the invention would be to provide an eyewear retainer that is lightweight, durable, inexpensive and attractive.

Still another objective of the present invention is to provide an eyewear retainer that will securely hold eyeglasses and will prevent them from falling to the ground or keep them in place on the user's face during work or other physical activities.

Further objectives and advantages of this invention will become more apparent from a consideration of the drawings and ensuing description.

The invention accordingly comprises the features of construction, combination of elements and arrangement of parts which will be exemplified in the construction, and illustration and description hereinafter set forth, and the scope of the invention will be indicated in the claims.

In a preferred embodiment, the eyewear retainer comprises: a first flexible braided tubular sleeve comprised of braided strings or ribbons, the sleeve being dimensioned at a first end to receive the first temple piece, wherein at least one of the first end and a second end of the sleeve is defined by a plurality of terminal ends of the strings or ribbons and wherein a plurality of the terminal ends of the strings or ribbons are bonded together, and a second flexible braided tubular sleeve comprised of braided strings or ribbons, the sleeve being dimensioned at a first end to receive the first temple piece, wherein at least one of the first end and a second end of the sleeve is defined by a plurality of terminal ends of the strings or ribbons and wherein a plurality of the terminal ends of the strings or ribbons are bonded together. The first end of the first sleeve is contractible in diameter upon application of a tensile force so as to grip the first temple piece, and wherein the first end of the second sleeve is contractible in diameter upon application of a tensile force so as to grip the second temple piece. For at least for one of the first sleeve and second sleeve, the ribbons or strings are bonded with epoxy, in at least one of the internal or external portion of said tubular sleeve thereby providing an additional frictional engagement with the temple piece, while maintaining a terminal opening of a length and a diameter to accept the respective temple piece, and which grips the temple piece when inserted therein. The first and second flexible braided tubular sleeves can be coupled together by a flexible member, wherein the flexible member is of a length to wrap around the back of the users head or neck. The first and second gripping member can be at the opposing ends of one long flexible braided tubular sleeve. The first and second gripping members are made up of an even number of strands of a flexible material woven together into a braided tube, with a preferred number of strands being 8 or 16 strands of string or ribbon. The terminal opening is of a diameter equivalent to 4 to 6 times the diameter or width of the string or ribbons used in the braid. The epoxy has a length of 0.25 to 1.25 centimeters (cm) to provide an ideal balance of the frictional force of the epoxy and force applied by the constriction of the braided material. The braided tubular sleeve is made from silicone rubber strings or ribbons, wherein the epoxy is a silicone-based epoxy, or is made from polyester, nylon or silk strings or ribbons, wherein the epoxy is a silicone-based epoxy.

In another preferred embodiment, the eyewear retainer comprises: a first flexible braided tubular sleeve comprised of braided rubber strings or ribbons, the sleeve being dimensioned at a first end to receive the first temple piece, wherein at least one of the first end and a second end of the sleeve is defined by a plurality of terminal ends of the strings or ribbons and wherein a plurality of the terminal ends of the strings or ribbons are bonded together, and a second flexible braided tubular sleeve comprised of braided silicone rubber strings or ribbons, the sleeve being dimensioned at a first end to receive the second temple piece, with one of the terminal ends of the member defined by the terminal ends of the strands, and where one or more of the terminal ends of the strands are held together. The first end of the first sleeve is contractible in diameter upon application of a tensile force so as to grip the first temple piece, and wherein the first end of the second sleeve is contractible in diameter upon application of a tensile force so as to grip the second temple piece. The first and second flexible braided tubular sleeves can be coupled together by a flexible member, wherein the flexible member is of a length to wrap around the back of the users head or neck. The first and second gripping member can be at the opposing ends of one long flexible braided tubular sleeve. The first and second gripping members are made up of an even number of strands of a flexible material woven together into a braided tube, with a preferred number of strands being 8 or 16 strands of string or ribbon. The terminal opening is of a diameter equivalent to 4 to 6 times the diameter or width of the string or ribbons used in the braid. The epoxy has a length of 0.25 to 1.25 centimeters (cm) to provide an ideal balance of the frictional force of the epoxy and force applied by the constriction of the braided material. The braided tubular sleeve is made from silicone rubber strings or ribbons, wherein the epoxy is a silicone-based epoxy, or is made from polyester, nylon or silk strings or ribbons, wherein the epoxy is a silicone-based epoxy.

In yet another preferred embodiment, the eyewear retainer comprises: a flexible braided tubular sleeve comprised of braided strings or ribbons, the sleeve being dimensioned at a first end to receive the first temple piece and dimensioned at a second end to receive the second temple piece, and wherein at least one of the first end and the second end of the sleeve is defined by a plurality of terminal ends of the strings or ribbons and wherein one or more of the terminal ends of the strings or ribbons are bonded together. The first end of the first sleeve is contractible in diameter upon application of a tensile force so as to grip the first temple piece, and wherein the first end of the second sleeve is contractible in diameter upon application of a tensile force so as to grip the second temple piece.

In a preferred form of the invention the braided tubular structure will constrict around the temples of the eyeglasses, similar to the way a "Chinese finger trap" tightens, when the braided tubular sleeve is placed under tension. This constriction effect also allows the eyewear retainer to conform to fit many different sizes and shapes of glass temples, providing a more universal fit than previous designs.

The epoxy on at least one end of the eyewear retainer provides additional frictional engagement with the eyepiece temple, while also holding the braided ends together so that the braid does not unravel. The epoxy section of the eyewear retainer combines with the constriction effect of the braided tubular sleeve due to tension and results in a very firm hold on the temples. For our preferred embodiment, a tension force of at least five pound force (lbf) can be placed upon to the eyewear retainer before it loses hold of the glasses. However, with mechanical manipulation provided by the user, it can also be easily removed. This combination of structure, namely, a braided tubular and epoxy ends, results in a very secure yet easy to use eyewear retainer.

The device can be used primarily in two ways, to wrap snuggly around the user's head, keeping eyewear in place on a user's face or to loosely wrap around the user's neck so that the eyewear can be. suspended from the user's neck while not in use. When used in either way, the eyewear retainer will prevent the eyewear from being dropped or knocked off of the user.

The device is placed around the back of the user's head or neck behind the ears, holding the eyewear in place under the desired tension. The device is of suitable length to wrap around the back of the users head or neck. By providing this additional length the tension of the retainer about the user's head or neck can be adjusted by the extent of the eyeglass temple that is inserted into the device. The device is especially useful during work or activities that require physical movement such that non-retained eyewear could fall off of the user's face and possibly damage the eyewear.

The device is simple, attractive, and overcomes the perceived deficiencies in the prior art. Additionally, the device is lightweight and flexible and can be coiled, wrapped, or folded into a small enough size to be conveniently stored in a pocket, purse, or eyeglasses case.

In a preferred form of the invention the braided sleeve will be braided in a continuous fashion and cut to length. Due to the bonded ends, the terminal end of the braid is inherently attached, which prevents the ends from fraying or the braid from losing its form.

BRIEF DESCRIPTION OF THE DRAWINGS

The above set forth and other features of the invention are made more apparent in the ensuing Description of the Preferred Embodiment when read in conjunction with the attached drawings, wherein:

FIG. 1 is a perspective view of the preferred embodiment of the eyewear retainer that utilizes string to form the braided tubular sleeve.

FIG. 2 is a perspective view of the preferred embodiment of the eyewear retainer that utilizes string to form the braided tubular sleeve and is being used in conjunction with a conventional pair of eyeglasses, with the eyewear retainer covering a large portion of the temple pieces.

FIG. 3 is a perspective view of the preferred embodiment of the eyewear retainer that utilizes ribbon to form the braided tubular sleeve.

FIG. 4 is a perspective view of the preferred embodiment of the eyewear retainer that utilizes ribbon to form the braided tubular sleeve and is being used in conjunction with a conventional pair of sunglasses or large frame eyeglasses.

FIG. 5 is a perspective view of the preferred embodiment of the eyewear retainer that utilizes string to form the braided tubular sleeve and is being used in conjunction with a conventional pair of eyeglasses, with the eyewear retainer covering a small portion of the temple pieces.

FIG. 6 is a perspective view of the preferred embodiment of the eyewear retainer that utilizes string to form the braided tubular sleeve and is being used in conjunction with a conventional pair of sunglasses or large frame eyeglasses, with the eyewear retainer covering a small portion of the temple pieces.

FIG. 7 is a perspective view of another preferred embodiment of the eyewear retainer that shows two braided tubular sleeves connection via another intermediary member, and is being used in conjunction with a conventional pair of eyeglasses.

FIG. 8 is a perspective view of another preferred embodiment of the eyewear retainer that shows two braided tubular sleeves connection via a floatation device or a continuous braided tubular sleeve covered by a floatation device.

FIG. 9 is a close-up side view of the eyewear retainer on a conventional pair of eyeglasses as shown in FIG. 2

FIG. 10 is a sectional cut of FIG. 9 along the view IV-IV

FIG. 11 is a sectional cut of FIG. 9 along the view III-III

FIG. 12 is a sectional cut of FIG. 9 along the view II-II

FIG. 13 is a sectional cut of FIG. 9 along the view I-I

Identical reference numerals in the figures are intended to indicate like parts, although not every feature in every figure may be called out with a reference numeral.

DESCRIPTION OF THE PREFERRED EMBODIMENT

Figure 15:
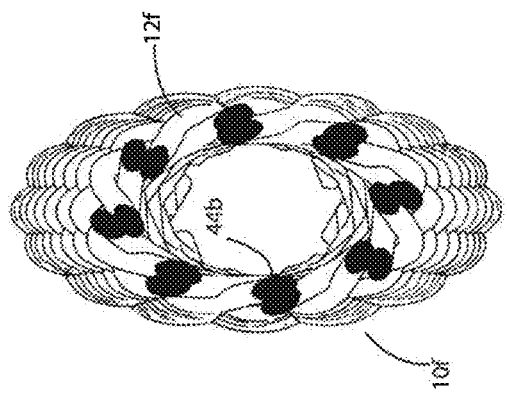
FIG. 15 is a sectional cut of FIG. 14 along the view VI-VI

The invention shows an improved eyewear retainer in FIG. 1, wherein braided tubular sleeves 12a are held together by bonded regions 14a. In this preferred embodiment, the eyewear retainer utilizes a continuous portion of a tubular braided sleeve 10a and the braid is made up of string. The braided tubular sleeve is constructed so as to maintain a terminal opening 16a that will accept the temple of a pair of glasses. The eyewear retainer can be placed onto glasses 18a as shown in FIG. 2. Each sleeve can be placed on the respective side of the glasses, the left temple piece 22a and the right temple piece 20a. When placed onto the glasses, the terminal opening 16a expands to fit the diameter of the temple piece 24a. Upon application of a tensile force, the braided tubular sleeve 26a will contract and tighten down on the temple piece to provide an extremely secure hold on the glasses. The bonded region 14b serves the dual purpose of adding to the frictional engagement with the surface of the temple piece, and for holding the braid together. The combination of the constriction effect from the braid and the friction due to the bonded region results in a superior hold of the glasses.

The braided element may also be from ribbon as shown in another preferred embodiment in FIG. 4, wherein the braided tubular sleeve 28b is continuous and formed from polyester, nylon, silk or other fabric ribbon. Compared to other fabric-based eyewear retainers, the hold is improved due to the structure of the device, namely, the constriction effect of the braid and the bonded region 14d. The ribbon version, like the string version, also tightens down on the temple when a tension is applied. The braid may be made up of ribbon or string and can utilize a number of strands, with the preferred number of strands being 8, 16, or 32. The diameter or width of the braid or ribbon and the number of strands can be selected so as to vary the diameter of the braid while maintaining the terminal opening to have maintain a diameter, of a preferred ratio of 4 to 6 relative to the string or ribbon characteristic width.

The length of the eyewear retainer may be extended as shown in FIG. 5, by not inserting the eyewear retainer as far on the left temple piece 22b and the right temple piece 20b.

Therefore, by changing the extent that the eyewear retainer covers the temple pieces, the user may easily change the effective length of the eyewear retainer so as to provide adjustability for the user.

Due to the construction of the eyewear retainer, it may be placed on thinner framed glasses like reading glasses 18a or eyeglasses 18b or on larger frame glasses like sunglasses 30a as shown in FIG. 6. For larger framed glasses 30a, the eyewear retainer expands to fit over the larger diameter of the temple piece 36a, by means of the expansion of the braided tubular sleeve 26b. The contraction and expansion allowable due to the braided structure as shown in FIG. 14, allows for a more universal fit to many sizes of eyewear frames.

In another preferred embodiment, the braided tubular sleeves may be used in conjunction with another intermediary element for aesthetic considerations such as with a solid cord, a chain, or a beaded string 38a, as shown in FIG. 7 or for added functionality such as with a floatation apparatus 40a as shown in FIG. 8.

Figure 14:
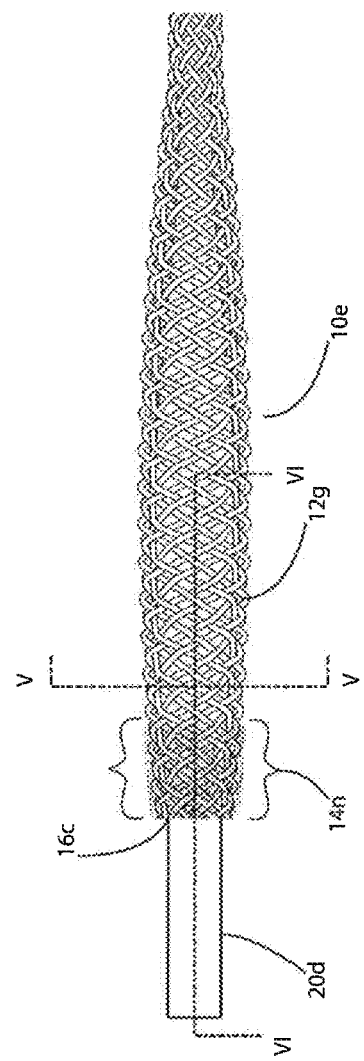
FIG. 14 is a close-up side view of the eyewear retainer on a conventional pair of eyeglasses as shown in FIG. 2
Figure 16:
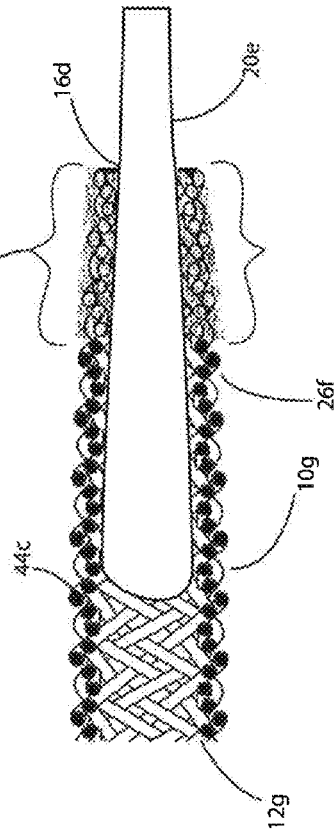
FIG. 16 is a sectional cut of FIG. 9 along the view V-V

The eyewear retainer conforms to various shapes and sizes of eyewear as demonstrated in FIG. 9 and FIG. 14. The constriction effect of the braid allows for a universal and snug fit over tapered or oddly shaped temples as shown in FIG. 14. Additionally, the bonded region 14j provides the eyewear retainer with more contact area so as to increase the friction between the eyewear retainer and the eyewear retainer.

The bonding region 14 has several properties that produce the correct flexibility of the bond, and friction required. The bonding agent is an epoxy, that is both flexible and tacky, with a silicone-based epoxy or sealant as the preferred type. The epoxy may be applied to the inner or outer sections of the braid, with the preferred embodiment having both portions having a thin coating of epoxy. The braid can be made in a continuous manufacturing process, with the outer layer used to hold the braid in place. The inner layer of epoxy must be a thin layer with a known thickness, which may be controlled by placing a pole of known diameter inside the braid while curing. This pole will control the thickness of the inner epoxy layer, while simultaneously providing a terminal opening 16a of a specific diameter. The length of the epoxy on the inside and outside should also be an ideal length of 0.25 cm to 1.25 cm, where any shorter will not hold the braided strands securely, and any longer will result in a stiff structure that will not be able to constrict and properly conform to the temples of a variety of glasses.

It can thus be seen that the present invention is advantageous and overcomes the perceived deficiencies in the prior art.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It should also be understood that the following claims are intended to cover all of the generic and specific features of the invention described herein and all statements of the scope of the invention that as a matter of language might fall there between.

The invention claimed is:

1. An eyewear retainer for glasses having a first temple piece and a second temple piece, the eyewear retainer comprising:

a first flexible braided tubular sleeve comprised of braided strings or ribbons, the sleeve being dimensioned at a first end to receive the first temple piece, wherein the first end of the sleeve is defined by a plurality of terminal ends of the strings or ribbons and wherein the plurality of the terminal ends of the strings or ribbons are bonded together to form a bonded region, and wherein the bonded region receives and grips a portion of the first temple piece that is received in the tubular sleeve, a second flexible braided tubular sleeve comprised of braided strings or ribbons, the sleeve being dimensioned at a first end to receive the second temple piece, wherein the first end of the sleeve is defined by a plurality of terminal ends of the strings or ribbons and wherein the plurality of the terminal ends of the strings or ribbons are bonded together to form a bonded region, and wherein the bonded region receives and grips a portion of the second temple piece that is received in the tubular sleeve, wherein the first end of the first sleeve is contractible in diameter upon application of a tensile force so as to grip the first temple piece, wherein the first end of the second sleeve is contractible in diameter upon application of a tensile force so as to grip the second temple piece, and wherein, each bonded region comprises a single layer of braided ribbons or strings that are bonded with epoxy in at least one of the internal or external portion of said tubular sleeve, thereby providing an additional frictional engagement with the respective temple piece, while maintaining a terminal opening of a length and a diameter to accept the respective temple piece.

2. The eyewear retainer of claim 1, wherein said first and second flexible braided tubular sleeves are coupled together by a flexible member.

3. The eyewear retainer of claim 2, wherein said flexible member is of a length to wrap around the back of the users head or neck.

4. The eyewear retainer of claim 1, wherein said first and second flexible braided tubular sleeves are the opposing ends of one long flexible braided tubular sleeve.

5. The eyewear retainer of claim 1, wherein the first and second flexible braided tubular sleeves are made up of an even number of strands of a flexible material woven together into a braided tube.

6. The eyewear retainer of claim 5, wherein the first and second gripping members are made up of 8 or 16 strands of string or ribbon woven together into a braided tube.

7. The eyewear retainer of claim 1, wherein the terminal opening is of a diameter equivalent to 4 to 6 times the diameter or width of the string or ribbons used in the braid.

8. The eyewear retainer of claim 1, wherein the epoxy has a length of 0.25 to 1.25 centimeters (cm) to provide an ideal balance of the frictional force of the epoxy and force applied by the constriction of the braided material.

9. The eyewear retainer of claim 1, wherein the braided tubular sleeve is made from silicone rubber strings or ribbons.

10. The eyewear retainer of claim 9, wherein the epoxy is a silicone-based epoxy.

11. The eyewear retainer of claim 1, wherein the braided tubular sleeve is made from polyester, nylon or silk strings or ribbons.

12. The eyewear retainer of claim 11, wherein the epoxy is a silicone-based epoxy.

13. An eyewear retainer for glasses having a first temple piece and a second temple piece, the eyewear retainer comprising:

a first flexible braided tubular sleeve comprised of braided silicone rubber strings or ribbons, the sleeve being dimensioned at a first end to receive the first temple piece, wherein the first end of the sleeve is defined by a plurality of terminal ends of the strings or ribbons and wherein the plurality of the terminal ends of the strings or ribbons are bonded together to form a bonded region, and wherein the bonded region receives and grips a portion of the first temple piece that is received in the tubular sleeve, a second flexible braided tubular sleeve comprised of braided silicone rubber strings or ribbons, the sleeve being dimensioned at a first end to receive the second temple piece, wherein the first end of the sleeve is defined by a plurality of terminal ends of the strings or ribbons and wherein the plurality of terminal ends of the strings or ribbons are bonded together to form a bonded region, and wherein the bonded region receives and grips a portion of the second temple piece that is received in the tubular sleeve, wherein the first end of the first sleeve is contractible in diameter upon application of a tensile force so as to grip the first temple piece, wherein the first end of the second sleeve is contractible in diameter upon application of a tensile force so as to grip the second temple piece, and wherein each bonded region comprises a single layer of braided silicone rubber ribbons or strings that are bonded with epoxy in at least one of the internal or external portion of said tubular sleeve, thereby providing an additional frictional engagement with the respective temple piece, while maintaining a terminal opening of a length and a diameter to accept the respective temple piece.

14. The eyewear retainer of claim 13, wherein said first and second flexible braided tubular sleeves are coupled together by a flexible member.

15. The eyewear retainer of claim 14, wherein said flexible member is of a length to wrap around the back of the users head or neck.

16. The eyewear retainer of claim 13, wherein said first and second flexible braided tubular sleeves are the opposing ends of one long flexible braided tubular sleeve.

17. The eyewear retainer of claim 13, wherein the first and second flexible braided tubular sleeves are made up of an even number of strands of a flexible material woven together into a braided tube.

18. The eyewear retainer of claim 17, wherein the first and second gripping members are made up of 8 or 16 strands of string or ribbon woven together into a braided tube.

19. The eyewear retainer of claim 13, wherein the terminal opening is of a diameter equivalent to 4.5 to 5.5 times the diameter or width of the string or ribbons used in the braid.

20. The eyewear retainer of claim 13, wherein the epoxy has a length of 0.25 to 1.25 centimeters (cm) to provide an ideal balance of the frictional force of the epoxy and force applied by the constriction of the braided material.

21. The eyewear retainer of claim 13, wherein the braided tubular sleeve is made from silicone rubber strings or ribbons.

22. The eyewear retainer of claim 21, wherein the epoxy is a silicone-based epoxy.

23. The eyewear retainer of claim 13, wherein the braided tubular sleeve is made from polyester, nylon or silk strings or ribbons.

24. The eyewear retainer of claim 23, wherein the epoxy is a silicone-based epoxy.

25. An eyewear retainer for eyeglasses having a first temple piece and a second temple piece, the eyewear retainer comprising:

a flexible braided tubular sleeve comprised of a single layer of braided strings or ribbons, the sleeve being dimensioned at a first end to receive the first temple piece and dimensioned at a second end to receive the second temple piece, wherein the first end and the second end of the sleeve are each respectively defined by a plurality of terminal ends of the strings or ribbons and wherein the terminal ends of the strings or ribbons of the respective first end and second end are bonded together to form respective bonded regions, and wherein the bonded region of the first end receives and grips a portion of the first temple piece and the bonded region of the second end receives and grips a portion of the second temple piece, wherein the first end of the sleeve is contractible in diameter upon application of a tensile force so as to grip the first temple piece, and wherein the second end of the sleeve is contractible in diameter upon application of a tensile force so as to grip the second temple piece.

wherein each bonded region comprises a single layer of braided ribbons or strings that are bonded with epoxy in at least one of the internal or external portion of said tubular sleeve, thereby providing an additional frictional engagement with the respective temple piece, while maintaining a terminal opening of a length and a diameter to accept the respective temple piece.

26. An eyewear retainer for glasses having a first temple piece and a second temple piece, the eyewear retainer comprising:

a first flexible braided tubular sleeve comprised of elastomeric braided strings or ribbons, the sleeve being dimensioned and single layered at a first end to receive and grip the first temple piece, wherein at least one of the first end and a second end of the sleeve is defined by a plurality of terminal ends of the strings or ribbons and wherein the plurality of the terminal ends of the strings or ribbons are bonded together to form a bonded region, and wherein the bonded region receives and grips a portion of the first temple piece that is received in the tubular sleeve, a second flexible braided tubular sleeve comprised of elastomeric braided strings or ribbons, the sleeve being dimensioned and single layered at a first end to receive and grip the second temple piece, wherein at least one of the first end and a second end of the sleeve is defined by a plurality of terminal ends of the strings or ribbons and wherein the plurality of the terminal ends of the strings or ribbons are bonded together to form a bonded region, and wherein the bonded region receives and grips a portion of the second temple piece that is received in the tubular sleeve, wherein the first end of the first sleeve is contractible in diameter upon application of a tensile force so as to grip the first temple piece, wherein the first end of the second sleeve is contractible in diameter upon application of a tensile force so as to grip the second temple piece, and wherein, each bonded region comprises a single layer of braided ribbons or strings that are bonded with epoxy, in at least one of the internal or external portion of said tubular sleeve, thereby providing an additional frictional engagement with the respective temple piece, while maintaining a terminal opening of a length and a diameter to accept the respective temple piece.

* * * * *